United States Patent [19]
Habicht

[11] Patent Number: 5,236,003
[45] Date of Patent: Aug. 17, 1993

[54] MODULAR BUTTERFLY VALVE

[76] Inventor: Helmut Habicht, 15 Royal Park Ter., Hillsdale, N.J. 07642

[21] Appl. No.: 5,605

[22] Filed: Jan. 19, 1993

[51] Int. Cl.$^5$ .................. F16K 1/22; F16K 1/226
[52] U.S. Cl. .................. 137/315; 251/148; 251/306; 251/367; 285/199
[58] Field of Search .............. 137/315; 251/148, 305, 251/306, 308, 367; 285/197, 198, 199

[56] References Cited

U.S. PATENT DOCUMENTS

| Re. 23,613 | 1/1953 | Danks | 251/335.1 |
|---|---|---|---|
| 3,129,920 | 4/1964 | Stillwagon | 251/306 |
| 3,241,806 | 3/1966 | Snell, Jr. | 251/306 |
| 3,314,641 | 4/1967 | Overbaugh | 251/148 |
| 3,874,631 | 4/1975 | Osthues | 251/306 |
| 3,910,552 | 10/1975 | Hills et al. | 251/148 |
| 4,060,220 | 11/1977 | Fischer | 251/306 |
| 4,146,206 | 3/1979 | Malloy et al. | 251/308 |
| 4,332,271 | 6/1982 | Rohr | 251/305 |
| 4,653,725 | 3/1987 | Nanz | 251/148 |
| 4,699,357 | 10/1987 | Sisk | 137/315 |

FOREIGN PATENT DOCUMENTS 937222  11/1973  Canada ................ 251/306

Primary Examiner—George L. Walton
Attorney, Agent, or Firm—Patrick J. Pinto

[57] ABSTRACT

A modular butterfly valve includes a disc member which is selectively rotated between an open and a closed position, a housing, a resilient valve seat, and a clamping ring which are held together by a hinged coupling ring. The disc member is resiliently suspended in this valve by the valve seat, which provides for a self-centering of the disc-member. The hinged coupling ring may include an integral actuation means which is keyed into alignment during assembly. This modular butterfly valve assembly is adapted for being attached to an adjacent apparatus by a quick coupling means.

13 Claims, 2 Drawing Sheets

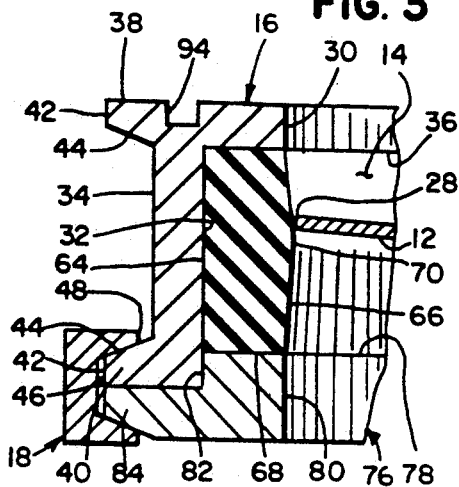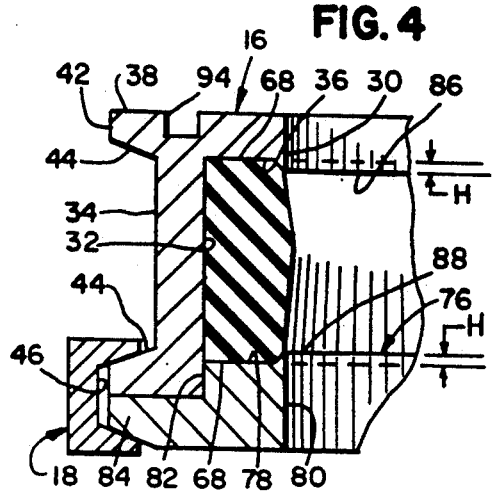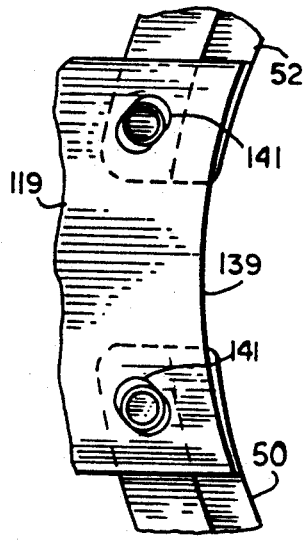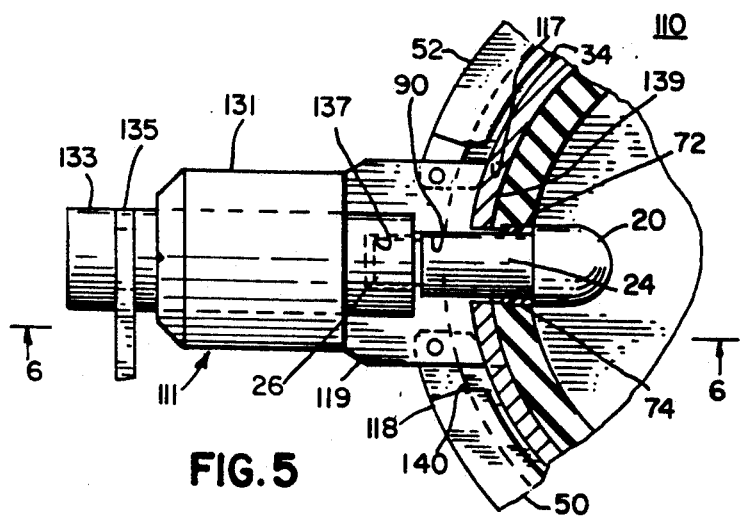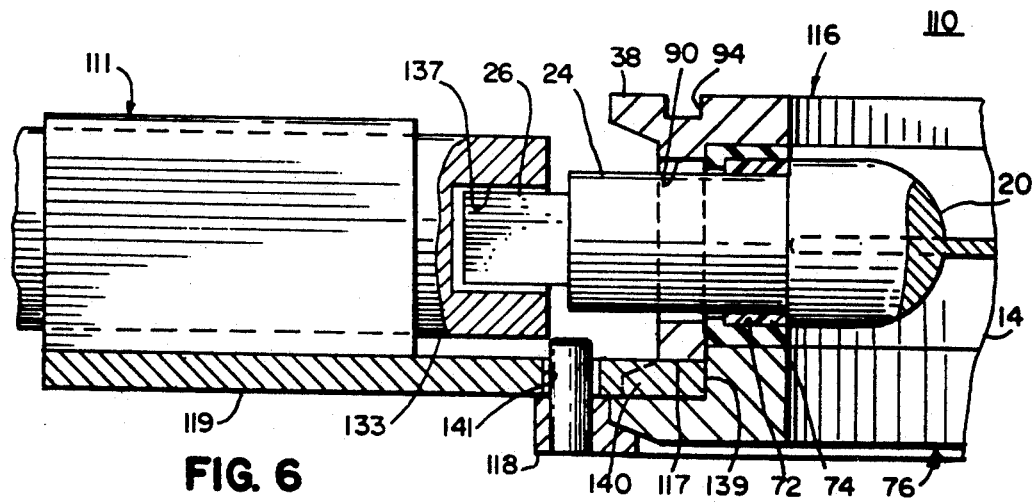

MODULAR BUTTERFLY VALVE

1. BACKGROUND OF THE INVENTION

With regard to the classification of art, this invention is believed to be found in the general class entitled "Valves and Valve Actuation" and more particularly to the subclasses pertaining to rotary butterfly valves.

2. DESCRIPTION OF THE PRIOR ART

Butterfly valves are well known in the prior art. Most of the known prior art include split housings which are held together by means of threaded fasteners. Many of these prior art butterfly valves are also attached to adjoining conduits and processing equipment by means of a plurality of threaded fasteners. The use of threaded fasteners usually requires the use of tools such as wrenches, screwdrivers and the like. It has been found that in many cases there is a need for a valve to be assembled or attached to adjoining equipment without the use of tools. This need has been identified particularly in the industries which require the sanitary processing of powders and the like. Such industries produce pharmaceuticals, baking ingredients, and blended food ingredients.

As far as it is known none of the prior art butterfly valves provide a modular butterfly valve which may be quickly uncoupled from adjoining equipment. In addition none of the known prior art provide a means for easily and quickly disassembling the butterfly valve for cleaning and sanitizing. The present valve overcomes the stated limations of the known prior art, by providing a butterfly valve which includes a modular construction. This modular construction allows for assembly of the valve substantially without tools, while employing quick coupling and uncoupling properties.

SUMMARY OF THE INVENTION

This invention may be summarized with respect to its objects. It is an object of this invention to provide and it does provide a butterfly valve which has a modular construction.

It is another object of this invention to provide and it does provide a modular butterfly valve with a valve seat and disc assembly which may be assembled or disassembled as a unit.

It is still another object of this invention to provide and it does provide a disc assembly which is self-centering in its valve seat.

It is yet another object of this invention to provide and it does provide a butterfly valve which is quickly coupled or uncoupled to adjoining process equipment without the use of tools.

It is still yet another object of this invention to provide and it does provide a butterfly valve which incorporates a self-aligning actuating assembly.

In addition to the above summary, the following disclosure is detailed to insure adequacy and aid in the understanding of this invention. This disclosure, however, is not intended to cover each new inventive concept no matter how it may be disguised either by variations in form or additions by further improvements. For this reason, there has been chosen specific embodiments of a modular butterfly valve. The specific embodiments have been chosen for the purpose of illustration and description as shown in the accompanying drawings wherein:

BRIEF DESCRIPTION OF THE DRAWING

FIG. 3 represents a cross-sectional elevational view of the butterfly valve, this view being in a enlarged scale and taken along line 3—3 of FIG. 1.

FIG. 4 represents an alternate construction of the valve housing, this view being taken in the same direction as FIG. 3.

FIG. 5 represents a plan view of one actuator means for the butterfly valve, this view being fragmentary and showing the combination coupling ring and mounting plate for the actuator means.

FIG. 6 represent an elevational view of the actuating means of FIG. 5, this cross-sectional view being shown in an enlarged scale and being taken along line 6—6 of FIG. 5.

FIG. 7 represents a fragmentary plan view of a pair of connection points for the combination coupling ring of FIG. 6.

Figure 1:
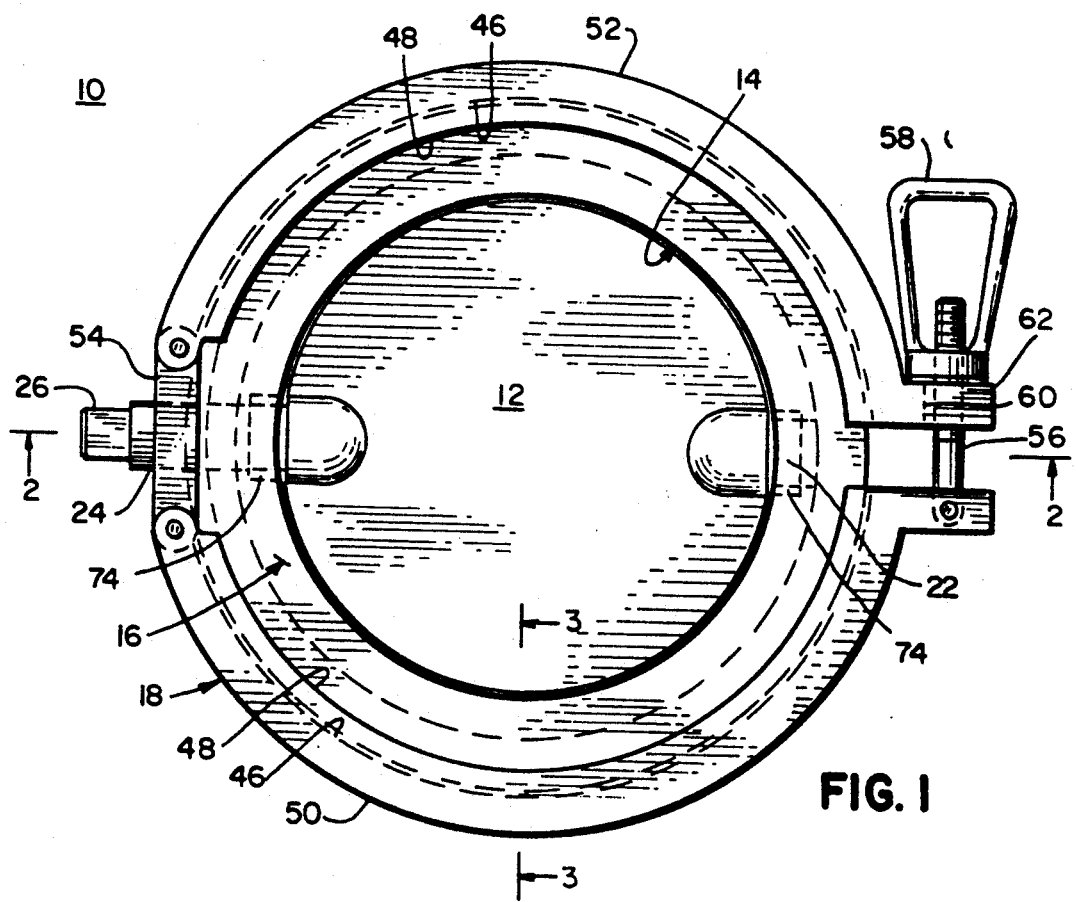
FIG. 1 represents a plan view of the modular butterfly valve of the present invention.

In the following description and in the claims, various details are identified by specific names for convenience. These names are intended to be generic in their application while differentiating between the various details. Corresponding reference characters refer to like members throughout the several figures of the drawings.

The drawing accompanying, and forming a part of this specification disclose details of construction for the sole purpose of explanation. It is understood that structural details may be modified without departing from the concept and principles of the invention. This invention may be incorporated in other structural forms than depicted in the drawings

DETAILED DESCRIPTION OF FIG'S. 1; 2 and 3

Referring to FIG. 1, there is shown a modular butterfly valve assembly, which is generally identified as 10. This butterfly valve assembly 10 includes a disc member 12; a valve seat 14, a housing 16; and at least one hinged coupling ring 18.

Referring now to FIG. 1; and 2; the disc member 12 includes opposed hubs 20 which are firmly attached to the disc member 12, by welding and the like. It is preferred that the welded connection of the hubs 20 to the disc 12 be made and contoured to provide a smooth flowing surface absent any voids in which flowing materials may collect. Shaft members 22 and 24 extend from their respective hubs 20. The hubs 20 are preferably round with spherical interior ends. The shafts 22 and 24 are formed with a reduced diameter to provide a shouldered arrangement. Shaft 24 is of sufficient length to extend exterior of the butterfly valve 10 in order to selectively rotate the disc member 20 between an open position and a closed position. The closed position is shown in FIG. 1. The end of the shaft 24 distal the hub member 20 is formed with an engaging end 26 such as a square, spline, and the like. This engaging end 26 provides a means for rotating the disc member 20 by a removable handle, which is not shown. It is also to be noted that the disc member 20 preferably is highly polished to minimize friction. It is also preferred that the peripheral sealing edge 28, seen in FIG. 3, should be radiused. For example a disc member 12 made of an 11

Ga. stainless steel material, preferably has a radius of 2.54 mm. (0.100 in.) formed on its sealing edge 28.

Referring in particular to FIG. 3, the housing 16 includes a cylindrical through bore 30, a counterbore 32, and an outside diameter 34. The counterbore 32 is formed substantially concentric with the through bore 30. This counter bore 32 is also formed to a predetermined depth to provide a shelf portion 36. The housing 16 also includes a first retaining flange 38 and a second retaining flange 40. Each of these retaining flanges 38 and 40 extend radially from the outside diameter 34 at the extreme ends of the housing 16. each of the retaining flanges 38 and 40 are formed with a preferred edge thickness 42 and an interior sloped side 44. Each of the retaining flanges 38 and 40 are countoured for a matching engagement by its associated hinged coupling ring 18.

The coupling ring 18 has a V-shaped groove 46 formed along an interior surface 48 of its two semi-circular ring portions 50 and 52. Referring again to FIG. 1, the ring portions 50 and 52 are pivotally carried by a link plate 54. Ring member 50 has a threaded stud member 56 pivotally attached thereto. A thumb nut 58 is threaded onto the stud 56. This thumb nut 58 may be loosened or tightened by hand. The ring 52 includes an open elongated slot 60 for engaging the stud 56 and thumb nut 58 assembly. The tightening action of the thumb nut 58 while engaging an ear 62 of the coupling ring 18 causes a reduction of the inside diameter of the coupling ring 18. Loosening and disengaging the thumb nut 58 from the ear 62 will allow the coupling ring 18 to be opened for removal from the housing 16.

Referring again to FIG. 3, the valve seat 14 is formed so as to have an outer diameter 64; a selectively contoured seat portion 66; and ends 68. This valve seat 14 is formed with a predetermined length which is measured between ends 68. The contoured seat portion 66 is contoured so that an inside diameter at the mid point 70 between ends 68 is 0.30 mm. (0.012 in.) smaller than the inside diameter at the ends 68. It is preferred that the the mid point 70 have a radiused crest portion which is blends smoothly to the ends 68.

Figure 2:
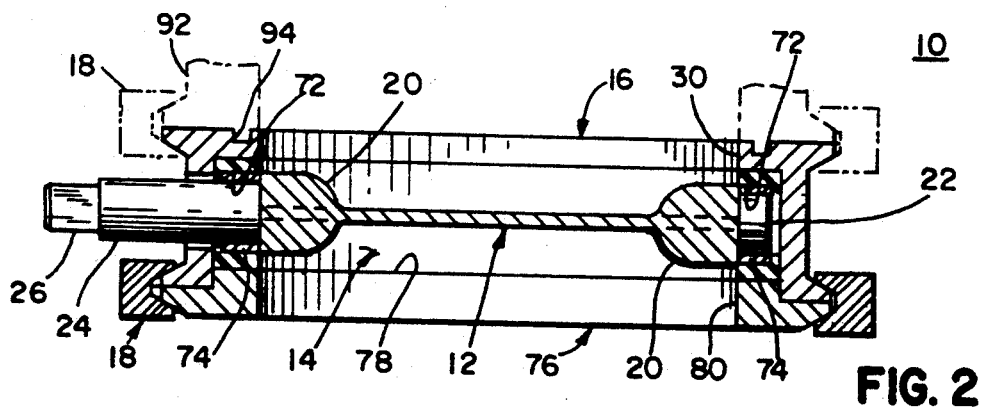
FIG. 2 represents a typical elevational view of the modular butterfly valve of the present invention, this view being shown in section and in a direction taken along line 2—2 of FIG. 1.

The valve seat 14 is preferably formed of a resilient material such as an FDA approved elastomer. The hardness of the elastomer is preferred to be in the range of 40 durometer. This valve seat 14 has a pair of shouldered apertures 72 formed therein, These shouldered apertures may be seen in FIGS. 2; 5; and 6. The shouldered apertures 72 have a determined depth to provide a shouldered portion in the valve seat 14. A pair of sleeve bearings or bushings 74 are provided to rotatably carry the shafts 22 and 24 of the disc member 12. Each of these bushings 74 is seated into its associated pocket 72. The length of each bushing 74 is substantially equal while being slightly longer that the depth of the pocket 72. For example, the length of each bushing 74 should be 0.12 mm. (0.005 in.) longer than the depth of the pocket 72. It is to be noted that the disc member 12 is resiliently suspended in the housing by the valve seat 14. This resilient suspension of the disc member 12 only by the valve seat 14 provides for a centered alignment with the valve seat 14 in at least two direction. That is the disc member 12 is centered with the mid point 70 in the direction of material flow as well as transverse to the material flow. The bushings 74, whose length is longer than the depth of the shouldered apertures 72, provides a biasing action to effect a face seal between the bushing 74 and its associated hub 20. This biasing action also allows the disc member 12 to center itself within the inside diameter at the mid point 70.

Referring again to FIG. 3, a shouldered clamping ring 76 is provided to retain the valve seat 14. In this arrangement, the valve seat 14 is sealed and retained between the shelf portion 36 and a face 78 of the clamping ring 76. This clamping ring 76 includes a second through bore 80; a pilot diameter 82; and third retaining flange 84. The pilot diameter 82 is selectively sized to closely and removably seat into the counter bore 32 of the housing 16. The third retaining flange 84 is sized to mate with the second retaining flange 40. The third retaining flange 84 is selectively contoured to be held in a preferred abutted condition with the second retaining flange 40 by the hinged clamping ring 18.

EMBODIMENT OF FIG. 4

Referring now to FIG. 4, an alternate construction of the housing 16 and the shouldered clamping ring 76 is shown. The housing 16 includes a first acute lip 86 which is formed at the intersection of the shelf portion 36 and the through bore 30. The clamping ring 76 includes a second acute lip 88 which is formed at the intersection of its face 78 and the second through bore 80. Each of these acute lips 86 and 88 are substantially equal in shape and size. The height H of each acute lip preferably is in the vicinity of 1.6 mm. (0.062 in.). The purpose of these acute lips 86 and 88 is to provide a smooth transition between the various components which are exposed in the passageway of the valve. A smooth transition ensures that little if any material will collect along the interior surface of the butterfly valve. Each of the acute lips 86 and 88 preferably have a side which is sloped at an angle between 40 and 50 degrees. The valve seat 14 may be beveled to match the acute lips 86 and 88.

EMBODIMENT OF FIGS. 5; 6; AND 7

Referring to FIG. 5, an alternate construction for a modular butterfly valve is generally identified as 110. This butterfly valve 110 includes most of the features of valve 10 with the exception that a modular mounting for an integral actuating means 111 is provided. The actuating means 111 may be of a manual type or a powered type. One example of a manual type is shown in my U.S. Pat. No. 4,462,567. A powered actuating means may include a pneumatically operated rotary actuator such as my U.S. Pat. No. 5,000,077. In this alternate arrangement for a valve 110, a housing 116 has similar construction to housing 16 with the exception that a second retaining flange 140 has a notched portion 117 formed therein. This notched portion 117 preferably is in alignment with a transverse aperture 90, which is provided for the shaft 24 to pass therethrough. This notched portion 117 is of a selected width for allowing a mounting plate 119 of a second hinged coupling ring 118 to seat therein. It is preferred that a clearance of 0.13 mm. (0.005 in) will provide the desired alignment while providing an easy insertion of the mounting plate 119. The mounting plate 119 is elongated to provide a mounting for the actuator means 111.

FIG. 5 represents a manual actuating means 119 which includes a block member 131, a rotating shaft 133; and a handle 135. One end of the shaft 133 includes an engagement recess 137 which matches the engaging end 26 of the shaft 24. It is preferred that a clearance be provided between the engagement recess 137 and the engaging end 26 for allowing the disc to self-align with the valve seat 14.

The mounting plate 119 further includes an inside edge 139 which is radiused to match the pilot diameter 82 of the clamping ring 76. The mounting plate 119 also provides a pivot point for the ring portions 50 and 52.

Referring now to FIGS. 6 and 7, the pivot connection of the mounting plate 119 is shown in greater detail. Since the mounting plate 119 abuts the pilot diameter 82 of the clamping ring 76, it is necessary to provide an elongated aperture 141. This elongated aperture 141 allows the ring portions 50 and 52 to properly seat on the retaining flanges 40 and 84. It is important that the elongated apertures 141 be formed at an angle with the axis of the shaft 24. The preferred angle is 45 degrees. This angular disposition allows the mounting plate 119 to be urged against the clamping ring 76 as the ring portions 50 and 52 are further engaged by tightening the thumb nut 58. It is to be pointed out that the mounting plate 119 is also firmly locked and located in the notched portion 117 between the housing 116 and the clamping ring 76 when the coupling ring 118 is in place.

USE AND OPERATION

The modular butterfly valves 10 and 110 may be easily attached to at least one adjacent apparatus 92, shown in dashed outline. It is necessary that the adjacent apparatus or conduit have a properly sized retaining flange provided at its end. Each of the butterfly valves 10 or 110 may be easily coupled to the apparatus 92 by engaging a coupling ring similar to hinged coupling ring 18. The housings 16 or 116 may be provided with a groove 94 for insertion of a gasket ring, such as a O-ring, quad ring and the like.

It is easily seen that the valves 10 and 110 may be easily coupled or uncoupled from an adjacent apparatus without the use of tools. It is also to be recognized that each of the valves may be disassembled for cleaning or maintenance without the use of tools. This feature allows for efficiency in operation of the equipment, since it allows an operator to remove and clean or sanitize the valve. Many industries require a mechanic to remove equipment when tools are involved. It can be appreciated that mechanics are not always available when needed, which increases downtime of the equipment.

It is contemplated that the valve 10 or 110 will be made of a corrosion resistant material such as stainless steel when used in situations requiring that sanitary standards be met. Of course other materials may be used when conditions would permit it.

It is also anticipated that a flexible coupling may be substituted for the engaging end 26 and the engagement recess 137.

Terms such as "left", "right", "up", "down", "bottom", "top", "front", "back", "in", "out" and the like may be used in the above description. These terms are applicable to the embodiments shown and described in conjunction with the drawings. These terms are merely for the purpose of description and do not necessarily apply to the position in which the modular butterfly valve of the present invention may be employed.

While these particular embodiments of the present invention have been shown and described, it is to be understood that the invention is not limited thereto and protection is sought to the broadcast extent the prior art allows.

What is claimed is:

1. A modular butterfly valve being adapted for a quick coupling to at least one adjacent apparatus, said butterfly valve including:
   a) a disc member adapted to be rotated between an open and a closed position, said disc member having opposed hubs, each hub having a shaft member extending therefrom, at least one of said shaft members having a sufficient length for extending exterior of said butterfly valve;
   b) a housing having a first cylindrical through bore and a counterbore formed concentrically with said first through bore, said counterbore having a determined depth for providing a shelf portion, said housing having a first retaining flange and a second retaining flange, said first retaining flange being selectively contoured for engagement by a first quick coupling ring, said second retaining flange being selectively contoured for engagement by a second quick coupling ring, a transverse aperture being adapted for allowing said shaft member extending exterior of said butterfly valve to pass therethrough,
   c) a resilient valve seat having an outer diameter, a selectively contoured seat portion, and a pair of transverse shouldered apertures, said valve seat also having a determined length, said outer diameter being adapted to closely and removably seat into said counterbore, each transverse shouldered aperture having a determined depth and shape;
   d) a pair of bushing members, each of said bushing members being adapted for removably seating into its associated transverse shouldered aperture of said valve seat, each bushing member having a selected length which is greater than the determined depth of said shouldered aperture, with at least one face of each of said bushings being adapted for providing a face seal with its associated hub of said disc member;
   e) a clamping ring having a second through bore, an pilot diameter, and a third retaining flange, said second through bore being substantially equal in diameter to said first through bore, said pilot diameter of said clamping ring being adapted to removably seat in said counterbore while retaining said valve seat in a preferred arrangement between a face of said clamping ring and said shelf portion of said housing, said third retaining flange being sized and contoured for a coupled abutment with said second retaining flange of said housing by said second coupling ring; and
   said disc member being resiliently suspended only by said valve seat, each of said bushings being equally biased by said valve seat for providing said face seal with said hub while providing a self-centering of said disc member.

2. A modular butterfly valve as recited in claim 1 wherein said second coupling ring includes two semi-circular ring portions, each of said semi-circular ring portions being pivotally connected at one end to a link plate, and each semi-circular ring having an end distal said pivoting end which is adapted for selectively loosening or tightening by hand.

3. A modular butterfly valve as recited in claim 2 wherein each semi-circular ring includes a V-shaped groove formed into an interior surface, said V-shaped groove sized for mating with and holding said second retaining flange and said third retaining flange in an abutted and aligned array.

4. A modular butterfly valve as recited in claim 1 wherein said selectively contoured seat portion of said resilient valve seat is shaped so that its inside diameter at its midpoint is reduced a selected amount from its second inside diameter at each end.

5. A modular butterfly valve as recited in claim 4 wherein said inside diameter is reduced 0.30 mm. (0.012 in.) and includes a radiused crest portion which blends smoothly to each of said ends.

6. A modular butterfly valve being adapted for a quick coupling to at least one adjacent apparatus, said butterfly valve including:
   a) a disc member adapted to be rotated between an open and a closed position, said disc member having opposed hubs, each hub having a shaft member extending therefrom, at least one of said shaft members having a sufficient length for extending exterior of said butterfly valve;
   b) a housing having a first cylindrical through bore and a counterbore formed concentrically with said first through bore, said counterbore having a determined depth for providing a shelf portion, said housing having a first retaining flange and a second retaining flange, said first retaining flange being selectively contoured for engagement by a first quick coupling ring, said second retaining flange being selectively contoured for engagement by a second coupling ring, said second retaining flange having a notched portion in alignment with a transverse aperture, said transverse aperture being adapted for allowing said shaft member extending exterior of said butterfly valve to pass therethrough,
   c) a resilient valve seat having an outer diameter, a selectively contoured seat portion, and a pair of tranverse shouldered apertures, said valve seat also having a determined length, said outer diameter being adapted to closely and removably seat into said counterbore, each transverse shouldered aperture having a determined depth and shape;
   d) a pair of bushing members, each of said bushing members being adapted for removably seating into its associated transverse shouldered aperture of said valve seat, each bushing member having a selected length which is greater than the determined depth of said shouldered aperture, with at least one face of each of said bushings being adapted for providing a face seal with its associated hub of said disc member;
   e) a clamping ring having a second through bore, an pilot diameter, and a third retaining flange, said second through bore being substantially equal in diameter to said first through bore, said pilot diameter of said clamping ring being adapted to removably seat in said counterbore while retaining said valve seat in a preferred arrangement between a face of said clamping ring and said shelf portion of said housing, said third retaining flange being sized and contoured for a coupled abutment with said second retaining flange of said housing by said second coupling ring;
   f) an actuator means adapted for externally rotating said disc member from said open to said closed position, said actuator means loosely engaging said end of said shaft exterior of said valve, said actuator means being carried by a mounting plate of said second coupling ring, said mounting plate being adapted for seating into said notched portion of said housing for providing a preferred alignment between said actuator means and said shaft; and
   said disc member being resiliently suspended only by said valve seat, each of said bushings being equally biased by said valve seat for providing said face seal with said hub while providing a self-centering of said disc member.

7. A modular butterfly valve as recited in claim 6 wherein said second coupling ring includes two semi-circular ring portions, each of said semi-circular ring portions being pivotally connected at one end to said mounting plate, and each semi-circular ring having an end distal said pivoting end which is adapted for selectively loosening or tightening by hand.

8. A modular butterfly valve as recited in claim 7 wherein each semi-circular ring includes a V-shaped groove formed into an interior surface, said V-shaped groove sized for mating with and holding said second retaining flange and said third retaining flange in an abutted and aligned array.

9. A modular butterfly valve as recited in claim 8 wherein an interior edge of said mounting plated is formed with a radius which conforms with a pilot diameter of said clamping for allowing substantially full abutment between said edge of said mounting plate and said pilot diameter.

10. A modular butterfly valve as recited in claim 9 wherein each pivotal connection of each semi-circular ring includes an elongated aperture which is disposed at a selected angle to an axis of said disc member for allowing full abutment of said edge while simultaneously coupling said clamping ring to said housing.

11. A modular valve as recited in claim 10 wherein said selected angle of each elongated aperture is 45 degrees.

12. A modular butterfly valve as recited in claim 6 wherein said selectively contoured seat portion of said resilient valve seat is shaped so that its inside diameter at its midpoint is reduced a selected amount from its larger diameter at each end.

13. A modular butterfly valve as recited in claim 12 wherein said inside diameter is reduced 0.30 mm. (0.012 in.) and includes a radiused crest portion which blends smoothly to each of said ends.

* * * * *